US008588154B2

(12) United States Patent
Ho

(10) Patent No.: US 8,588,154 B2
(45) Date of Patent: Nov. 19, 2013

(54) MITIGATION OF INTERFERENCE BETWEEN WIRELESS NETWORKS

(75) Inventor: Jin-Meng Ho, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 966 days.

(21) Appl. No.: 12/697,092

(22) Filed: Jan. 29, 2010

(65) Prior Publication Data

US 2010/0195603 A1 Aug. 5, 2010

Related U.S. Application Data

(60) Provisional application No. 61/148,620, filed on Jan. 30, 2009.

(51) Int. Cl.
*H04W 4/00* (2009.01)
*H04B 7/00* (2006.01)

(52) U.S. Cl.
USPC ............................................ 370/329; 455/69

(58) Field of Classification Search
USPC ...................................................... 370/329
See application file for complete search history.

(56) References Cited

U.S. PATENT DOCUMENTS

| 7,174,134 | B2 * | 2/2007 | Klein et al. ...................... 455/69 |
| 7,496,081 | B2 * | 2/2009 | Salokannel et al. ........... 370/348 |
| 8,116,295 | B2 * | 2/2012 | Reumerman et al. ......... 370/348 |
| 2004/0156427 | A1 * | 8/2004 | Gilhousen et al. ............. 375/150 |
| 2006/0251017 | A1 * | 11/2006 | Bishop ........................... 370/330 |
| 2006/0251098 | A1 * | 11/2006 | Morioka ......................... 370/432 |
| 2009/0034552 | A1 * | 2/2009 | Yonge et al. .................... 370/458 |
| 2009/0135780 | A1 * | 5/2009 | Kitchin .......................... 370/329 |
| 2009/0252112 | A1 * | 10/2009 | Shimomura et al. .......... 370/330 |
| 2010/0142396 | A1 * | 6/2010 | Kim et al. ...................... 370/252 |

OTHER PUBLICATIONS

Davenport, MedWiN MAC and Security Proposal—Documentation, IEEE P802.15, May 4, 2009.

* cited by examiner

*Primary Examiner* — Guang Li
(74) *Attorney, Agent, or Firm* — Alan A. R. Cooper; W. James Brady, III; Frederick J. Telecky, Jr.

(57) ABSTRACT

A system and method for minimizing or preventing interference between wireless networks is disclosed. A network hub broadcasts a beacon signal within repeating beacon periods. The position of the beacon signal shifts within each beacon period based upon a predetermined pseudo-random sequence. The beacon signal includes data identifying the current beacon shift sequence and the current phase of the sequence. Neighboring hubs independently or jointly determine and broadcast their own beacon shift sequences and phases for their respective networks from a predetermined list. Nodes connected with the network hubs are assigned allocation intervals having a start time that is set relative to the beacon signal. The start time and duration of the allocation interval wraps around the beacon period if the allocation-interval would otherwise start or continue in a next beacon period.

29 Claims, 4 Drawing Sheets

MITIGATION OF INTERFERENCE BETWEEN WIRELESS NETWORKS

CROSS-REFERENCE TO RELATED APPLICATIONS

The present application claims the benefit of the filing date of U.S. Provisional Patent Application No. 61/148,620, which is titled "Mitigation of Interference between Wireless Networks" and filed Jan. 30, 2009, the disclosure of which is hereby incorporated by reference herein in its entirety.

TECHNICAL FIELD

Embodiments of the invention are directed, in general, to coexistence between wireless networks and, more specifically, to mitigating inter-network interference by changing the transmission time of a beacon reference signal.

BACKGROUND

Mutual interference between wireless devices is a well-known problem. At a basic level, when two devices attempt to exchange information, the devices typically coordinate their transmit times so that they are not transmitting to each other simultaneously. When more devices are added to form a network, each additional device must also coordinate its transmit time so that two or more devices do not simultaneously transmit to a network hub. Networks may designate specific transmit times for each device. However, this solution becomes more complicated as new devices are added to a network and the available transmit times are used up.

The interference-avoidance problem becomes more complicated when multiple networks operate in the same area. Two or more neighboring networks may experience transmission collisions not only between nodes in the same network, but also between nodes in the separate networks. Frequency separation may be used to avoid transmission collisions between these separate networks. However, this solution will not work when the multiple devices must transmit on a common channel, such as when two networks happen to operate on the same channel for intended or unintended reasons.

For ad hoc networks that can be formed in any location, spatial separation cannot be used to avoid transmission collisions on the same channel. Accordingly, there is a need for a procedure to avoid mutual interference among networks that transmit on the same or adjacent frequency bands.

SUMMARY OF THE INVENTION

Groups of wireless devices or nodes are organized into networks, each having a network hub. Node access to a common channel is coordinated by the hub, but access is not coordinated between networks, which can result in inter-network interference. A beacon is transmitted by the hub in each beacon period. Each beacon contains timing, access, and capability information. The beacon transmission time, relative to the start of a beacon period, shifts from one beacon period to next according to a pseudo-random sequence. Different pseudo-random sequences are used by neighboring network hubs. Repeated collisions between inter-network beacons and other transmissions are circumvented when neighboring network hubs use different beacon shift sequences. The current shift sequence index and the phase of the shift sequence are encoded in the beacon frame, which allows each node in the network to readily determine the next beacon time.

The hub transmits a beacon frame including a beacon shift sequence index and beacon shift sequence phase. The beacon shift sequence index identifies the pseudo-random shift sequence governing the beacon transmission pattern currently in use. In one embodiment, nine predetermined beacon shift sequences are defined and related to specific indices, including a sequence providing no beacon offset in each beacon period. The beacon shift sequence phase is set to the current phase or position of the chosen beacon shift sequence in the current beacon period.

Embodiments of the invention minimize or prevent inter-network interference by rotating the beacon transmission times from one beacon period to next. As a result of shifting beacon transmission times, the allocated intervals for each node in the network are shifted from one beacon period to next as well. Beacon transmission times are encoded in a beacon frame by the transmitting hub, which allows nodes in the hub's network to identify their respective allocation intervals. Hubs may independently or jointly choose their own beacon shifting patters without exchanging time sharing messages between them.

BRIEF DESCRIPTION OF THE DRAWINGS

Figure 1:
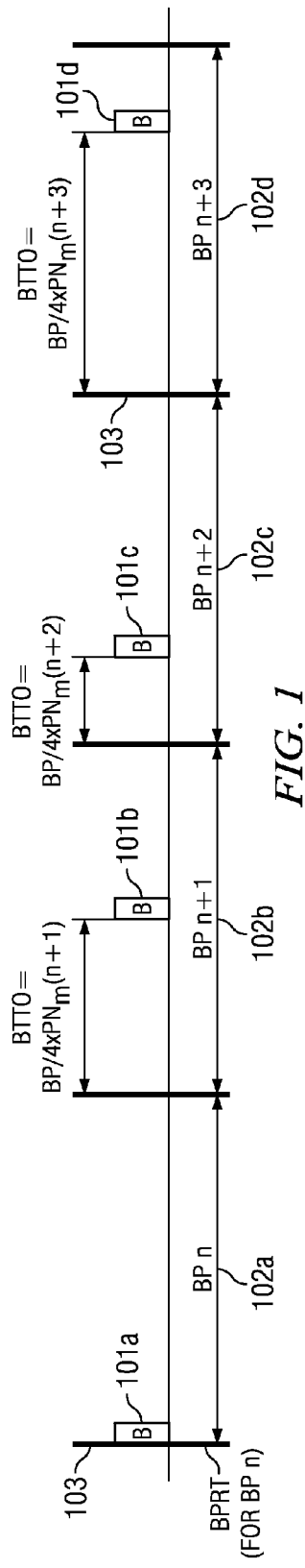
Figure 2:
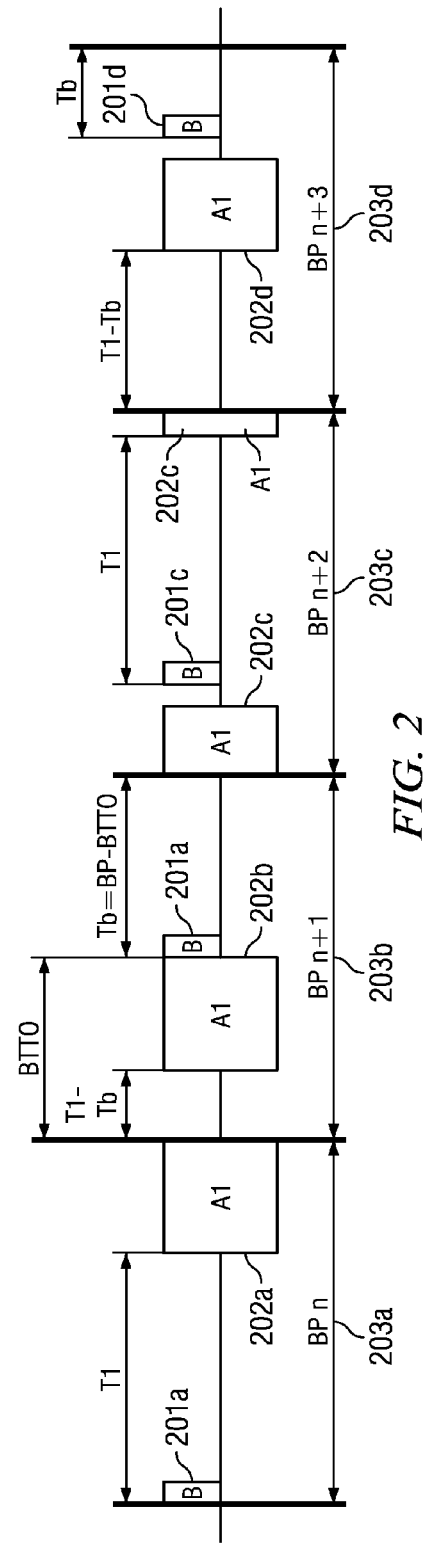
Figure 3:
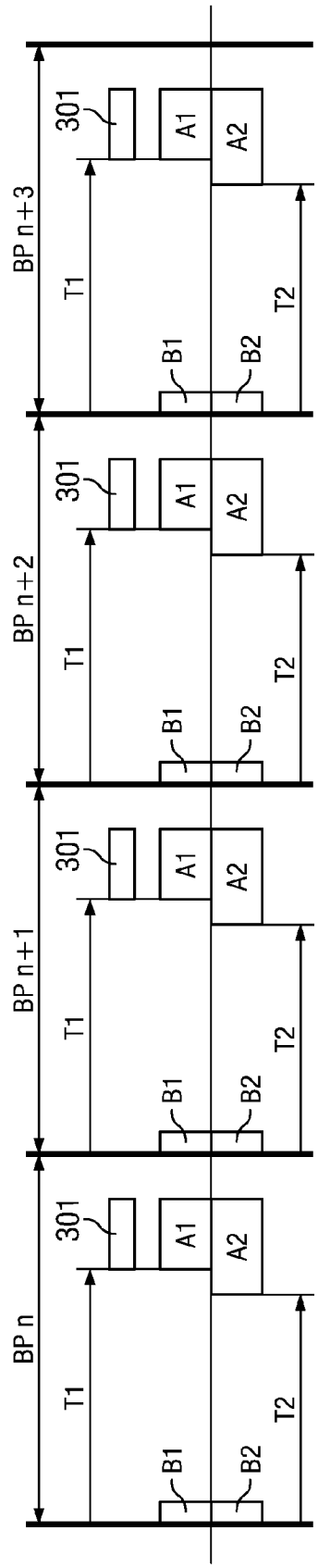
Figure 4:
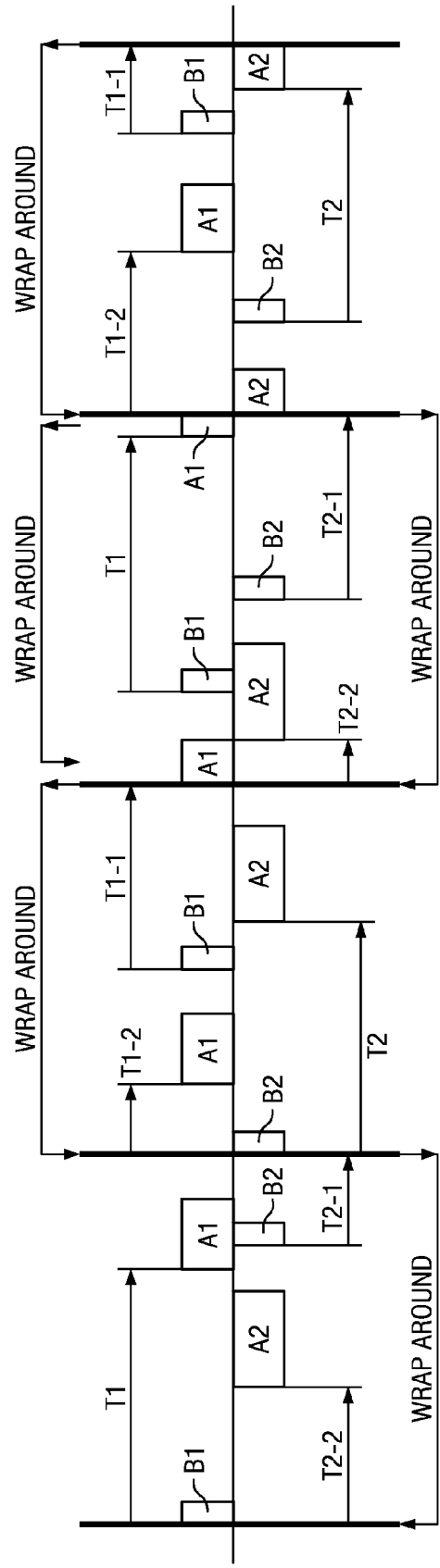
Figure 5:
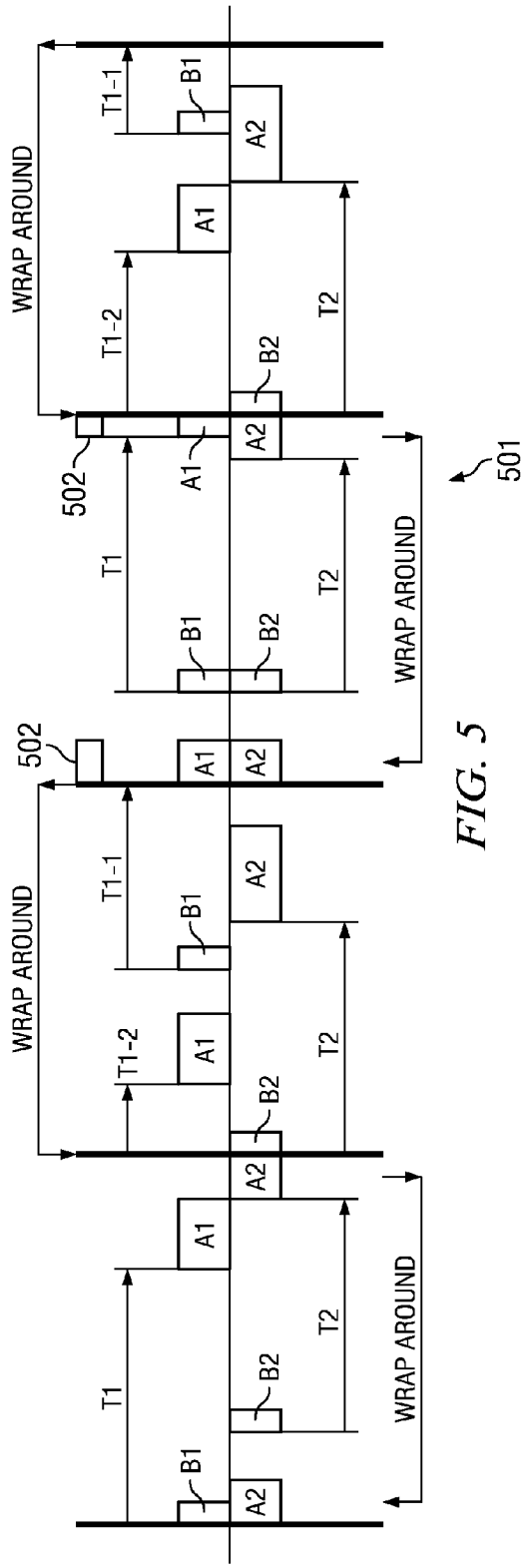
Figure 7:
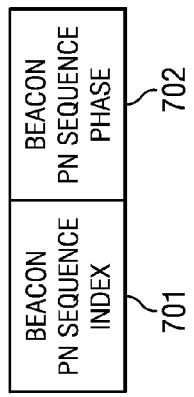
Figure 6:
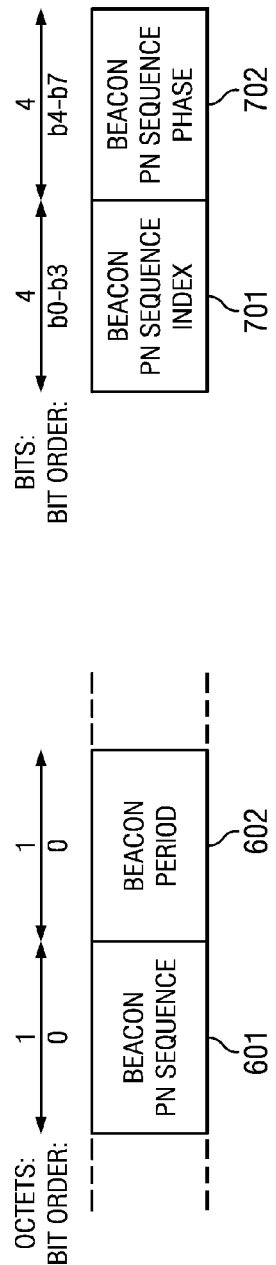
Figure 8:
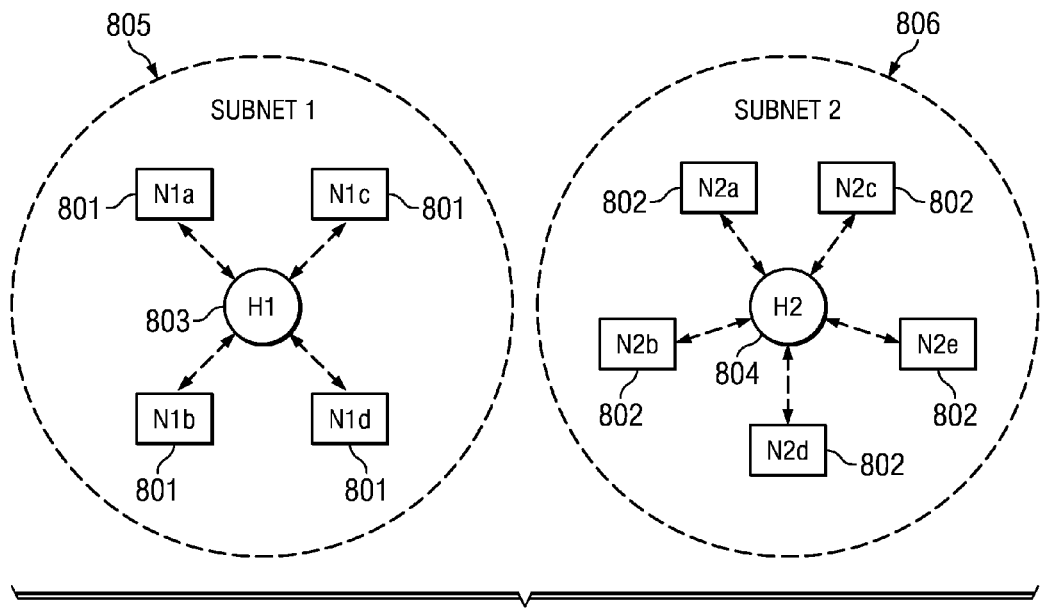
Figure 9:
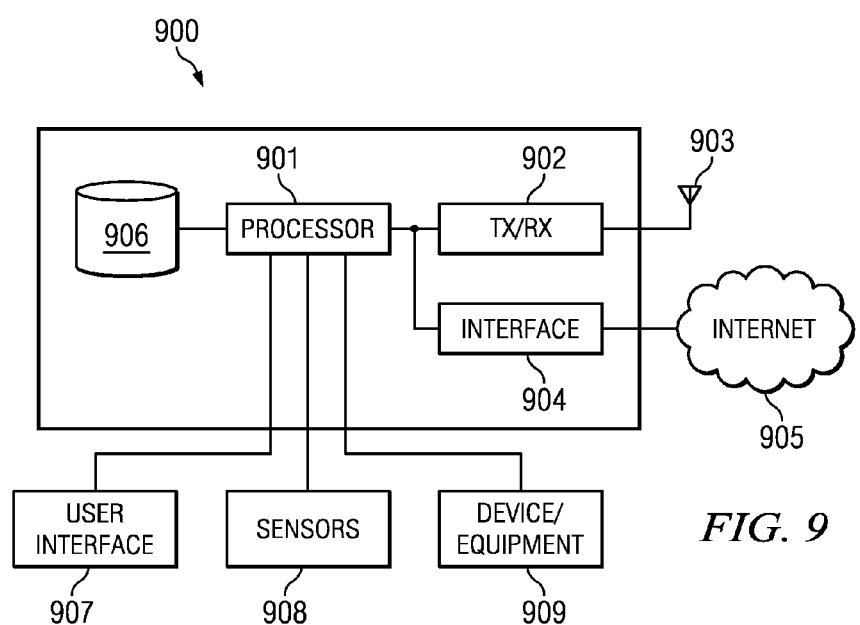

Having thus described the invention in general terms, reference will now be made to the accompanying drawings, wherein:

FIG. 1 illustrates the use of offset beacon frames within a plurality of beacon periods according to an exemplary embodiment of the invention;

FIG. 2 illustrates a time relationship between an allocation interval and a beacon over a series of beacon periods;

FIG. 3 illustrates a time relationship between adjacent networks using the same shift sequence;

FIG. 4 illustrates a time relationship between adjacent networks using the same shift sequence that are offset in phase;

FIG. 5 illustrates a time relationship between adjacent networks using different shift sequences that are offset in phase;

FIG. 6 illustrates one embodiment of beacon shifting information transmitted in the beacon by a hub;

FIG. 7 illustrates a beacon shift sequence comprising a beacon shift sequence index and beacon shift sequence phase;

FIG. 8 is a block diagram illustrating a network topology employing embodiments of the invention; and FIG. 9 is a block diagram of an exemplary embodiment of a device for providing interference mitigated communications with another device.

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

In one embodiment, a group of wireless devices form an ad hoc network with one of the devices acting as a network hub. Among other functions, the hub is responsible for coordinating the transmission time of each of the nodes in the network and for resolving transmission time conflicts to prevent or minimize intra-network interference.

The hub transmits a beacon frame B that is used as a reference point by the nodes within the hub's network to determine each respective node's transmission time. The beacon frames B are transmitted once within repeating beacon periods BP. The duration of the beacon period is selected by the hub. The beacon B may be transmitted at the beginning of each beacon period or at some time offset from the start of the beacon period.

FIG. 1 illustrates the use of offset beacon frames 101a-d within a plurality of beacon periods 102a-d according to an exemplary embodiment of the invention. The hub selects the duration of the beacon period and preferably does not change its beacon period while one or more nodes are connected with it. The start of each beacon period 102a-d is designated as the beacon period reoccurring time (BPRT) 103. The beacon frames 101a-d occur at a designated time that is offset from the BPRT. The offset is referred to herein as the beacon transmission time offset (BTTO). The BTTO may be any value from zero (i.e. no offset) to the end of the beacon period, but is preferably set to a multiple of one-quarter of the beacon period (i.e. BP/4). For example, beacon 101a is not offset within the beacon period (BP/4×0), beacon 101b is offset by half of the beacon period (BP/4×2), beacon 101c is offset by one-quarter of the beacon period (BP/4×1), and beacon 101d is offset by three-quarters of the beacon period (BP/4×3).

The offset value can be represented by the following equation:

$$BTTO = PN_m(n) \times BP/4, \quad (1)$$

Here, $PN_m$ is a pseudo-random beacon shifting sequence, m is a beacon shifting sequence index selected by the hub for its beacon transmission time pattern, BP is the length of the beacon period, and n is the phase of the chosen sequence (n=0, 1, ...).

The values of the beacon shifting sequence for the index m=0 are all set to 0 (i.e., $PN_0(n)=0$, n=0, 1, ...). With this sequence, the beacon transmission time always occurs at the start of each beacon period. For other index m values, the beacon shifting sequence $PN_m(n)$ adjusts the beacon transmission time among two or more values selected from the values: 0, 1, 2, and 3. Examples of beacon shifting sequences $PN_m(n)$ for different values of index m are shown below in Table 1. The hub should choose a beacon shifting sequence $PN_m(n)$ that is not being used by neighboring hubs in order to mitigate potential repeated beacon collisions. The use of different beacon shifting sequences $PN_m(n)$ between overlapping or adjacent networks will also reduce conflicts between nodes by the nodes' transmissions at scheduled or allocated times. Beacon shift sequence index m=5 from Table 1 is illustrated in the example of FIG. 1.

TABLE 1

| BEACON SHIFTING SEQUENCE INDEX (m) | BEACON SHIFTING SEQUENCE PATTERN (PNm(n)) ("..." INDICATES PATTERN REPEAT) |
|---|---|
| 0 | $PN_0(n) = 0, 0, 0, 0, \ldots$ |
| 1 | $PN_1(n) = 0, 1, 0, 1, \ldots$ |
| 2 | $PN_2(n) = 0, 2, 0, 2, \ldots$ |
| 3 | $PN_3(n) = 0, 1, 2, 3, \ldots$ |
| 4 | $PN_4(n) = 0, 1, 3, 2, \ldots$ |
| 5 | $PN_5(n) = 0, 2, 1, 3, \ldots$ |
| 6 | $PN_6(n) = 0, 2, 3, 1, \ldots$ |
| 7 | $PN_7(n) = 0, 3, 1, 2, \ldots$ |
| 8 | $PN_8(n) = 0, 3, 2, 1, \ldots$ |
| 9-15 | Reserved |

A beacon frame is transmitted by the hub in each beacon period. Each beacon frame contains timing, access, and capability information. For example, the sequence index m and the phase n of the PN sequence being used by the hub are encoded in the beacon frame, which allows each device in the network to readily determine the next beacon time. The beacon transmission time, relative to the beacon period recurring time (BPRT), changes from one beacon period to next according to the selected PN sequence. Repeated inter-network beacon and other transmission collisions are circumvented by neighboring hubs using different PN sequences or the same PN sequence offset in phase.

In one embodiment, the hub assigns an allocation interval A1 to each node. The allocations are time intervals that a node or a hub uses to initiate frame transactions. FIG. 2 illustrates the relationship between allocation A1 202a-d and beacon B 201a-d over a series of beacon periods BP 203a-d. The start time of the allocation within each beacon period begins at time T1, which is defined relative to the start of the beacon transmission time. Because the transmission of the beacon may occur after the start of the beacon period, the delay T1 may result in the allocation interval extending beyond the end of the current beacon period. To compensate for the situation where the allocation would begin or continue after the beacon period, the allocation interval "wraps around" the beacon period to the BPRT.

In FIG. 2, allocation start time T1 is the beginning of the allocation in the beacon period relative to the beacon transmission time. In beacon period 203a, allocation 202a begins time T1 after beacon 201a, which allows allocation 202a to fit within the beacon period. In beacon periods 203b and 203d, the start times for allocations 202b and 202d are determined by wrapping the allocation start time T1 within the beacon period so that the start of the allocation occurs before the beacon transmission. Allocations 202b and 202d begin at the time: T1−Tb after the start of the beacon period, wherein time Tb is the time remaining in the beacon period after the beacon transmission time offset (Tb=BP−BTTO).

In beacon period 203c, allocation 202c begins after the transmission of beacon 201c; however, there is not enough time remaining in the beacon period to complete the allocation interval 202c. Therefore, allocation 202c is wrapped around the beacon period, which results in a fragmented allocation interval. In the example illustrated in FIGS. 1 and 2, potential beacon offsets from the beacon period repetition time occur at one-quarter intervals within the beacon period (i.e. 0, ¼ BP, ½ BP, and ¾ BP). An allocation would not be fragmented if A1<BP/4. However, even if A1>BP/4, little efficiency will be lost due to fragmentation with appropriate allocation position and duration.

FIGS. 3-5 illustrate the time relationships between adjacent networks using various beacon shifting sequences. In a first network, a first hub transmits a beacon frame B1, and a node associated with the first hub is assigned allocation A1 at time T1. In a second network, a second hub transmits a beacon frame B2, and a node associated with the second hub is assigned allocation A2 at time T2.

In FIG. 3, the networks use the same PN sequence. The first hub and second hub both use the same beacon shifting sequence index (e.g. m=0), in which both beacon frames B1 and B2 occur at the same time (e.g. zero offset from the BPRT in each beacon period). Due to the assigned interval start times T1, T2, node allocations A1 and A2 overlap, thereby causing collisions 301 and mutual interference in every beacon period.

In FIG. 4, the networks use the same PN sequence, but are offset in phase. The first hub and the second hub both use beacon shifting sequence index m=5, so that beacon frames B1 and B2 follow the same beacon shift sequence (0, 2, 1, 3, ...). However, in FIG. 4, the first hub and second hub are offset in phase. For example, when the first hub is transmitting beacon B1 for phase n, the second hub is transmitting beacon B2 for phase n−1. As a result, node allocations A1 and A2 in the respective networks never overlap and do not create collisions.

In FIG. 5, the networks use different PN sequences and are offset in phase. The first hub uses beacon shifting sequence index m=5, so that beacon frames B1 follow beacon shift sequence (0, 2, 1, 3, . . . ). The second hub uses beacon shifting sequence index m=1, so that beacon frames B1 follow beacon shift sequence (0, 1, 0, 1, . . . ). In addition to using different beacon shift sequences, the first hub and second hub are also offset in phase. For example, when the first hub is transmitting beacon B1 for phase n, the second hub is transmitting beacon B2 for phase n+1. In most of the beacon periods, the shifting beacon frames and allocations result in no overlap. However, occasionally, such as in beacon period 501, the respective beacon frames B1, B2, occur at the same time and allocation intervals A1, A2 also partially overlap resulting in collision 502 and mutual interference. Although the mutual interference occurs in one out of four beacon periods (25%), the nodes are still able to communicate with their respective hubs in the other three out of four beacon periods (75%), and hence mutual interference is mitigated.

FIG. 6 illustrates one embodiment of beacon shifting information transmitted in the beacon period by a hub. Beacon PN sequence 601 comprises the beacon PN sequence index 701 and beacon PN sequence phase 702 information as illustrated in FIG. 7. Beacon PN sequence index 701 is set to the index of the PN sequence governing the beacon transmission pattern currently in use by the hub. Nine examples of PN sequences are defined above in Table 1, including PN sequence 0 which provides for no beacon offset within all beacon periods. Beacon PN sequence phase 702 is set to the phase (i.e., position) of the chosen PN sequence in the current beacon period. The value of beacon PN sequence phase 702 cycles between 0 and 3 in the current example. Beacon period 602 contains the length of the beacon periods effective in the network.

Although the embodiment described herein sets forth nine examples of beacon shift sequences based on four phase positions, it will be understood that other beacon shift sequences may also be used and that the beacon periods may be divided into different numbers of phase positions. In other embodiments, for example, the hub may select the number of available phase positions based upon the length of the beacon period, the number of nodes that can be connected with the hub, and the number of neighboring hubs detected.

FIG. 8 is a block diagram illustrating a network topology employing embodiments of the invention. Nodes 801, 802 and hubs 803, 804 are organized into logical sets, referred to as networks. In the illustrated embodiment, there is only one hub in a network, but the number of nodes in a network may vary. For example, network 1 805 comprises hub 803 and plurality of nodes 801, and network 2 806 comprises hub 804 and plurality of nodes 802. In one embodiment, messages are exchanged directly between the nodes and their respective hub—i.e. within the same network only. In another embodiment of the invention, messages may be exchanged between different networks. The hub and nodes may communicate using a wireless or wireline connection. Each hub transmits a beacon frame to its respective nodes. The beacon frame may include the data illustrated above in FIGS. 6 and 7, for example, including the beacon shift sequence index, beacon shift sequence phase, and beacon period length currently in use by the hub. Preferably, hub 804 selects a different beacon shift sequence index and/or a different beacon shift sequence phase than the index/phase currently in use by hub 803. The term network is used herein, but will be understood to be interchangeable with terms such as subnet or cluster. The term hub as used herein will be understood to be interchangeable with other network control devices, such as a cluster controller.

FIG. 9 is a block diagram of an exemplary embodiment of a device 900 for providing interference mitigated communications with another device. Device 900 may be used as a node 901, 902 and/or a hub 903, 904 in FIG. 9. Processor 901 processes messages to be exchanged with other nodes via transceiver 902 and antenna 903 and/or via wireline interface 904 coupled to Internet or another network 905. Processor 901 may be a software, firmware, or hardware based device. Processor 901 may compute or select a beacon shift sequence index, beacon shift sequence phase, beacon period length, and beacon frame. Processor 901 may also monitor beacon frames transmitted by other hubs to evaluate beacon shift sequences in use by other networks. Processor 901 may receive and process beacons containing a beacon shift sequence index, beacon shift sequence phase, and beacon period length. Process 901 may shift allocation intervals with shifting beacon transmission times.

Memory 906 may be used to store beacon data, such as beacon shift sequence patterns, a current beacon shift sequence index, beacon shift sequence phase, and beacon period length. Memory 906 may be secured from unauthorized access. Memory 906 may also be used to store computer program instructions, software and firmware used by processor 901. It will be understood that memory 906 may be any applicable storage device, such as a fixed or removable RAM, ROM, flash memory, or disc drive that is separate from or integral to processor 901.

Device 900 may be coupled to other devices, such as user interface 907, sensors 908, or other devices or equipment 909. In one embodiment, device 900 is a hub, gateway, or controller controlling and communicating with one or more nodes. In another embodiment, device 900 is a low-power wireless node operating on, in, or around a human or non-human body to serve one or more applications, such as medical connections, consumer electronics, and personal entertainment. Device 900 may be adapted to operate in a body area network either as a node or as a hub controlling a plurality of nodes. Sensors 908 may be used, for example, to monitor vital patient data, such as body temperature, heart rate, and respiration. Equipment 909 may be, for example, a monitor or other device that receives and analyzes signals, such as a patient's temperature, heart rate, and respiration, from another node. Alternatively, equipment 909 may be a device for providing a service to a patient, such as controlling an intravenous drip, respirator, or pacemaker.

When used as a node or hub in a body area network, the information transmitted or received by device 900 is likely to include sensitive or critical medical information or instructions. Accordingly, it is important to ensure that data transmitted by the nodes or hub is not disrupted or blocked by interference from other nodes within the same or other networks. The messages transmitted or received by device 900 may also include control signals, such as signals to control distribution of medicine or operation of a respirator or pacemaker. It is important that these signals are properly transmitted and received to control equipment 909.

It will be understood that the networks 805, 806 in FIG. 8 and device 900 in FIG. 9 are presented for illustrative purposes only and are not intended to limit the scope of the systems or devices that are capable of employing the beacon shift sequence and mutual-interference mitigation procedures described herein. Any two devices in wireless or wireline communication with each other and each having the capability to adjust a beacon frame timings would be capable of using these procedures Many modifications and other embodiments of the invention will come to mind to one skilled in the art to which this invention pertains having the benefit of the teachings presented in the foregoing descriptions, and the associated drawings. Therefore, it is to be understood that the invention is not to be limited to the specific embodiments disclosed. Although specific terms are employed herein, they are used in a generic and descriptive sense only and not for purposes of limitation.

What is claimed is:

1. A method for transmitting a beacon signal, comprising:
   generating a beacon frame to be transmitted in a beacon period, the beacon period beginning at a beacon period reoccurring time,
       the beacon frame comprising a beacon shifting sequence identifier and a beacon shifting sequence phase,
       the beacon shifting sequence identifier indicating a specific beacon shifting sequence comprising a repeating series of beacon transmission time offsets, and
       the beacon shifting sequence phase indicating a current position within the beacon shifting sequence;
   determining a current beacon shifting sequence for the beacon frame;
   determining the beacon shifting sequence phase for the beacon frame;
   determining a current beacon transmission time offset corresponding to the beacon shifting sequence phase;
   transmitting the beacon frame at a time delayed after the beacon period reoccurring time by the current beacon transmission time offset,
   monitoring beacon frame transmissions by another device;
       identifying an active beacon shifting sequence currently in use by the other device, where the active beacon shifting sequence is the same as the current beacon shifting sequence;
       identifying an active beacon shifting sequence phase for the other device in the current beacon period; and
   selecting a current beacon shifting sequence phase that is different from the active beacon shifting sequence phase; and
       transmitting the beacon frame at a time delayed after the beacon period reoccurring time by a beacon transmission time offset corresponding to the current beacon shifting sequence phase.

2. The method of claim 1, further comprising:
   storing a plurality of beacon shifting sequences in a memory.

3. The method of claim 2, further comprising:
   monitoring one or more beacon frame transmissions by one or more other devices;
   identifying active beacon shifting sequences currently in use by the other devices;
   selecting a new beacon shifting sequence that is different from the active beacon shifting sequences.

4. The method of claim 3, wherein the new beacon shifting sequence is selected to minimize interference.

5. The method of claim 4, wherein the interference includes overlapping transmissions between beacon frames transmitted by two or more hubs in different networks.

6. The method of claim 4, wherein the interference includes overlapping transmissions between frames transmitted by devices in different networks.

7. The method of claim 1, wherein the current beacon shifting sequence for the beacon frame is preselected.

8. The method of claim 1, further comprising:
   assigning an allocation interval and an allocation-interval start time to a node.

9. The method of claim 8, wherein the allocation-interval start time is defined relative to the beacon signal start time, and
   wherein the allocation-interval start time wraps around a current beacon period if the allocation interval would otherwise be pushed outside the current beacon period.

10. The method of claim 9, wherein the allocation interval for the current beacon period occurs before the beacon signal.

11. The method of claim 9, wherein the allocation interval is divided if the allocation interval would otherwise overlap the current beacon period and a next beacon period, wherein a portion of the allocation interval that would otherwise overlap the next beacon period occurs at the beginning of the current beacon period.

12. The method of claim 1, wherein the repeating series of beacon transmission time offsets are defined as multiples of one-quarter the beacon period.

13. The method of claim 1, wherein the repeating series of beacon transmission time offsets are defined as occurring at the beacon period reoccurring time without delay.

14. A method of timing transmissions, comprising:
   detecting one or more beacon signals broadcast by a network hub during a beacon period, the beacon period beginning at a beacon period reoccurring time;
   identifying a beacon shift sequence index and a beacon shift sequence phase in the beacon signals;
   selecting, from a list of beacon shift sequences, an active beacon shift sequence corresponding to the index,
       each of the specific beacon shift sequences comprising a repeating series of beacon transmission time offsets,
       each of the beacon transmission time offsets corresponding to a phase within the beacon shift sequence and identifying a delay after the beacon period reoccurring time before a beacon signal is transmitted for that phase;
   generating a frame for transmission to the network hub;
   determining a beacon signal transmission time for a specific beacon period by identifying the beacon shift sequence phase and a corresponding beacon transmission time offset for the specific period;
   determining a frame transmission time for the specific beacon period, the frame transmission time occurring a defined interval after the start of the beacon signal transmission time;
   transmitting the frame at the frame transmission time,
   monitoring beacon frame transmissions by another device;
       identifying an active beacon shifting sequence currently in use by the other device, where the active beacon shifting sequence is the same as the current beacon shifting sequence;
       identifying an active beacon shifting sequence phase for the other device in the current beacon period; and
   selecting a current beacon shifting sequence phase that is different from the active beacon shifting sequence phase; and
       transmitting the beacon frame at a time delayed after the beacon period reoccurring time by a beacon transmission time offset corresponding to the current beacon shifting sequence phase.

15. The method of claim 14, further comprising:
   storing the list of beacon shift sequences in a memory.

16. The method of claim 14, further comprising:
   identifying an allocation interval and an allocation-interval start time, and wherein the defined interval is the allocation-interval start time.

17. The method of claim 16, wherein the frame is transmitted during the allocation interval.

18. The method of claim 16, wherein the allocation-interval start time is defined relative to the beacon transmission time, and
wherein the allocation-interval start time wraps around a current beacon period if the allocation interval would otherwise be pushed outside the current beacon period.

19. The method of claim 16, wherein the allocation interval for the current beacon period occurs before the beacon signal.

20. The method of claim 16, wherein the allocation interval is divided if the allocation interval would otherwise overlap the current beacon period and a next beacon period, wherein a portion of the allocation interval that would otherwise overlap the next beacon period occurs at a beginning of the current beacon period.

21. A network hub, comprising:
a circuit for transmitting and receiving signals;
a memory for storing a list of beacon shifting sequences; and
a processor adapted to perform operations on received signals and to construct signals for transmission, the processor operating to:
generate a beacon frame to be transmitted in a beacon period, the beacon period beginning at a beacon period reoccurring time,
the beacon frame comprising a beacon shifting sequence identifier and a beacon shifting sequence phase,
the beacon shifting sequence identifier indicating a specific beacon shifting sequence comprising a repeating series of beacon transmission time offsets, and
the beacon shifting sequence phase indicating a current position within the beacon shifting sequence;
identify the current beacon shifting sequence and the beacon shifting sequence phase for the beacon frame;
determine a current beacon transmission time offset corresponding to the beacon shifting sequence phase; and
transmit the beacon frame at a time delayed after the beacon period reoccurring time by the current beacon transmission time offset,
wherein the processor further operates to:
monitor one or more beacon frame transmissions by one or more other devices;
identify active beacon shifting sequences currently in use by the other devices, where the active beacon shifting sequence is the same as the current beacon shifting sequence;
select a new beacon shifting sequence that is different from the active beacon shifting sequences,
identify an active beacon shifting sequence phase for the other device in the current beacon period;
select a current beacon shifting sequence phase that is different from the active beacon shifting sequence phase; and
transmit the beacon frame at a time delayed after the beacon period reoccurring time by a beacon transmission time offset corresponding to the current beacon shifting sequence phase.

22. The network hub of claim 21, wherein the new beacon shifting sequence is selected to minimize interference.

23. The network hub of claim 22, wherein the interference includes overlapping transmissions between beacon frames transmitted by two or more hubs in different networks.

24. The network hub of claim 22, wherein the interference includes overlapping transmissions between frames transmitted by devices in different networks.

25. A network node, comprising:
a circuit for transmitting and receiving signals;
a memory for storing a list of beacon shifting sequences; and
a processor adapted to perform operations on received signals and to construct signals for transmission, the processor operating to:
detect one or more beacon signals broadcast by a network hub during a beacon period, the beacon period beginning at a beacon period reoccurring time;
identify a beacon shift sequence index and a beacon shift sequence phase in the beacon signals;
select, from a list of beacon shift sequences, an active beacon shift sequence corresponding to the index,
each of the specific beacon shift sequences comprising a repeating series of beacon transmission time offsets,
each of the beacon transmission time offsets corresponding to a phase within the beacon shift sequence and identifying a delay after the beacon period reoccurring time before a beacon signal is transmitted for that phase;
generate a frame for transmission to the network hub;
determine a beacon signal transmission time for a specific beacon period by identifying the beacon shift sequence phase and a corresponding beacon transmission time offset for the specific period;
determine a frame transmission time for the specific beacon period, the frame transmission time occurring a defined interval after the start of the beacon signal transmission time; and
transmit the frame at the frame transmission time,
wherein the processor further operates to:
monitor beacon frame transmissions by another device;
identify an active beacon shifting sequence currently in use by the other device, where the active beacon shifting sequence is the same as the current beacon shifting sequence;
identify an active beacon shifting sequence phase for the other device in the current beacon period;
select a current beacon shifting sequence phase that is different from the active beacon shifting sequence phase; and
transmit the beacon frame at a time delayed after the beacon period reoccurring time by a beacon transmission time offset corresponding to the current beacon shifting sequence phase.

26. The network node of claim 25, wherein the processor further operates to:
identify an allocation interval and an allocation-interval start time, and wherein the defined interval is the allocation-interval start time.

27. The network node of claim 26, wherein the frame is transmitted during the allocation interval.

28. The network node of claim 26, wherein the allocation-interval start time is defined relative to the beacon frame, and
wherein the allocation-interval start time wraps around a current beacon period if the allocation interval would otherwise be pushed outside the current beacon period.

29. The network node of claim 26, wherein the allocation interval is divided if the allocation interval would otherwise overlap the current beacon period and a next beacon period, wherein a portion of the allocation interval that would otherwise overlap the next beacon period occurs at a beginning of the current beacon period.

* * * * *